E. LOCKWOOD.
TWO SPEED LAWN MOWER.
APPLICATION FILED AUG. 10, 1915.
1,160,297.
Patented Nov. 16, 1915.
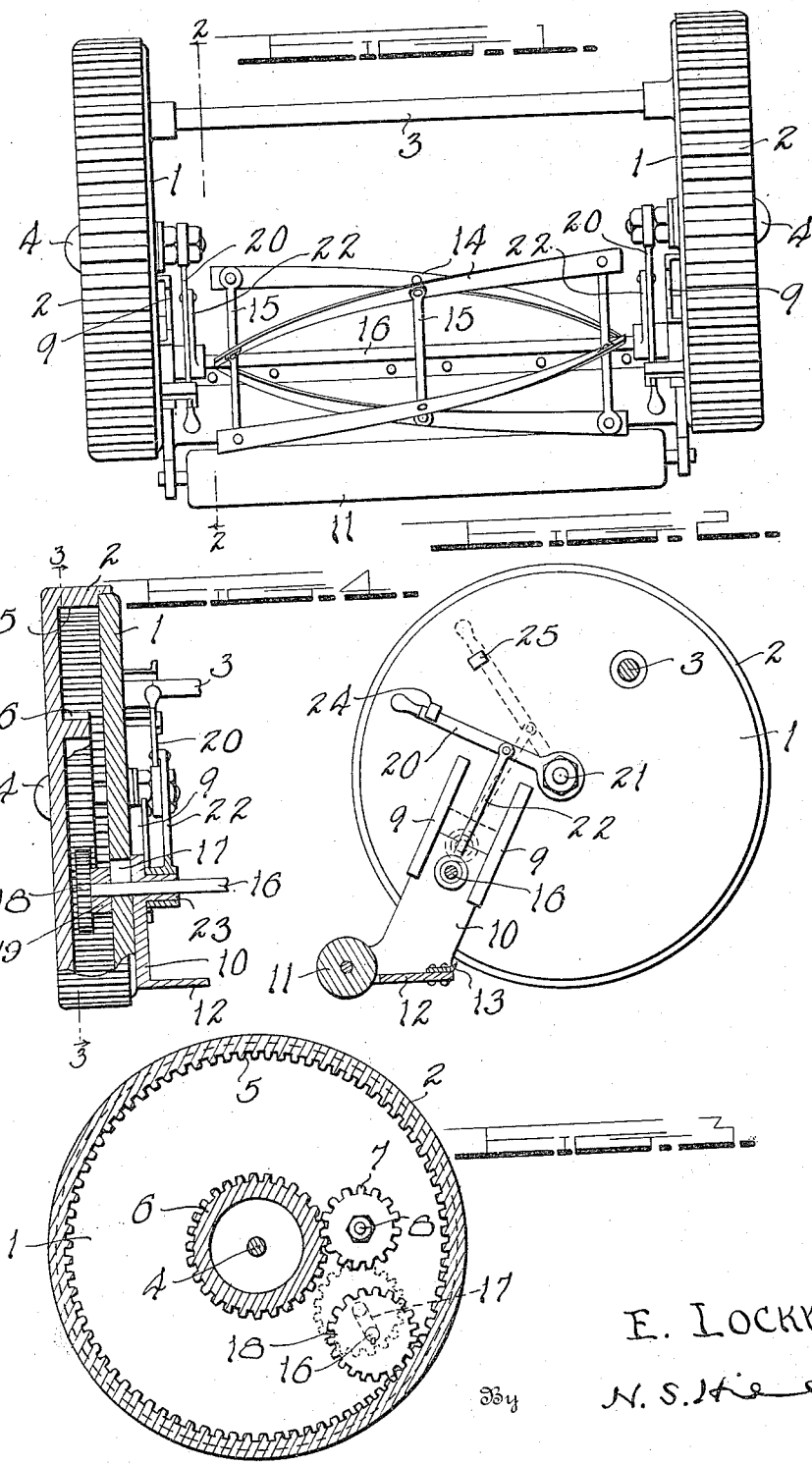
Inventor
E. LOCKWOOD
By N. S. H———
Attorney

UNITED STATES PATENT OFFICE.

ELMER LOCKWOOD, OF BYRON, ILLINOIS.

TWO-SPEED LAWN-MOWER.

1,160,297.  Specification of Letters Patent.  Patented Nov. 16, 1915.

Application filed August 10, 1915. Serial No. 44,723.

*To all whom it may concern:*

Be it known that I, ELMER LOCKWOOD, a citizen of the United States, residing at Byron, in the county of Ogle and State of Illinois, have invented certain new and useful Improvements in Two-Speed Lawn-Mowers, of which the following is a specification.

The present invention relates to certain new and useful improvements in lawn mowers, and has for its object to provide a device of this character which embodies novel features of construction whereby the rotary cutter may be caused to rotate at different speeds so as to operate in the most effective manner upon different kinds of grass, a high speed being preferable for long grass, while a low speed is preferable for short grass.

Further objects of the invention are to provide a lawn mower of this character which is comparatively simple and inexpensive in its construction, which can be quickly adjusted to cause the cutter to revolve at either a high speed or a low speed, which will not get out of adjustment after being once set, and which has a rigid and durable construction.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a lawn mower constructed in accordance with the invention, the handle being removed. Fig. 2 is a transverse sectional view through the same on the line 2—2 of Fig. 1 looking in the direction of the arrows. Fig. 3 is a transverse sectional view through one of the traction wheels, on the line 3—3 of Fig. 4. Fig. 4 is a rear view of one end of the lawn mower with portions being broken away and shown in section to illustrate more clearly the details of construction.

Corresponding and like parts are referred to in the following description and indicated in all the views of the drawing by the same reference characters.

Specifically describing the present embodiment of the invention, the numerals 1 designate the usual circular end plates of the main frame, said end plates having the flanged driving wheels 2 pivotally mounted thereon and being rigidly connected in some suitable manner as by means of the cross bar 3 so as to provide a main supporting frame for the cutting mechanism. The flanged wheels 2 are mounted upon the pivot bolts 4 in the usual manner, and each of the said flanged drive wheels is provided with a large interior rack 5 and a comparatively small concentric gear 6. These comparatively small gear members 6 mesh with idlers 7 which are pivoted at 8 upon the end plates 1 and arranged within the hollow spaces provided by the flanged drive wheels.

Each of the end plates 1 is provided upon the inner face thereof with a pair of guide flanges 9 which coöperate with each other to provide an inclined guideway within which a slide bar 10 is mounted. The lower ends of the slide bars 10 have the roller 11 journaled between the same, and are connected by a bed 12 upon which the fixed knife blade 13 is mounted. The rotary blades 14 are mounted for coöperation with the fixed blade 13, being carried by suitable arms 15 which project from the cutter shaft 16, the ends of the cutter shaft being journaled within suitable bearings provided in the slide bars 10 and projecting through slots 17 into the hollow spaces within the respective flanged drive wheels 2. Pinions 18 are applied to the extremities of the cutter shaft 16, and spacing blocks 19 are shown as interposed between the pinions 18 and the end plates 1. These pinions 18 can be caused to mesh with either the large interior racks 5 or with the idlers 7 driven by the comparatively small gear members 6. In the former instance the cutter shaft 16 and rotary blades 14 would be revolved at a high rate of speed, while in the latter instance the cutter shaft and blades would revolve at a lower rate of speed.

The shifting of the pinions 18 for changing the speed of rotation of the rotary cutter is controlled by the movement of the slide bars 10 within the guide flanges 9. An operating lever 20 is provided at each end of the lawn mower, said operating levers being pivotally mounted at 21 upon the central portions of the end plates 1, and being connected by links 22 to bearing sleeves 23 which project from the slide bars 10 and receive the cutter shaft 16. Each of the end plates 1 is also provided with a pair of oppositely facing hooked latch members 24 and 25 which are arranged to engage the operating levers 20 at opposite limits of the movements thereof.

When it is desired to use the lawn mower upon comparatively long grass, the best results could be obtained by a high speed rotation of the cutter, and the pinions 18 would accordingly be moved into engagement with the interior racks 5. The sliding movements of the bars 10 are limited by engagement of the shaft 16 with the ends of the slots 17 in the end plates 1, and the operating levers 20 are formed of spring or resilient material so that they must be slightly flexed and sprung into engagement with the respective hooked latch member 24 or 25 after the gearing has been shifted in the desired manner. When using the lawn mower to cut long grass, the operating levers 20 would be sprung into engagement with the hooked latches 24 and the slide bars 10 thereby locked in such a position as to maintain the pinions 18 in mesh with the interior racks 5 of the large gear wheels 2. On the other hand, when using the lawn mower to cut short grass, the operating levers 20 would be sprung into engagement with the hooked latch members 25, thereby locking the slide bars 10 in such a position as to maintain the pinions 18 in mesh with the idlers 7. The cutter would then rotate at a slower speed. In either case the resiliency of the operating levers 20 serves to maintain them in proper engagement with the respective hooked latch members so that the mechanism will be held in proper adjustment while being used.

Having thus described the invention, what I claim as new and desire to secure by Letters Patent, is:—

1. A multiple speed lawn mower including a main frame formed with end plates, drive wheels mounted upon the end plates and formed with large and small gear elements, cutting mechanism mounted upon the main frame and including a cutter shaft, pinions upon the cutter shaft, and means for causing the pinions of the cutter shaft to be driven from either the large or the small gear elements of the drive wheels.

2. A multiple speed lawn mower, including a main frame formed with end plates, drive wheels mounted upon the end plates and formed with large and small gear elements, a cutting mechanism slidably mounted upon the main frame and including a cutter shaft, pinions upon the cutter shaft, means for sliding the cutting mechanism to cause the pinions of the cutter shaft to mesh with either the large or small gear elements of the drive wheels, and means for locking the cutting mechanism in an adjusted position.

3. A multiple speed lawn mower, including a main frame formed with end plates, drive wheels mounted upon the end plates and formed with large and small gear elements, side bars slidably mounted upon the end plates, a fixed blade carried by the side bars, a cutter shaft journaled up on the side bars, rotary blades carried by the cutter bars, pinions applied to the cutter shaft, and means for sliding the side bars to bring the pinions of the cutter shaft into mesh with either the large or small gear elements of the drive wheels.

4. A multiple speed lawn mower including a main frame formed with end plates, drive wheels mounted upon the end plates and formed with large and small gear elements, side bars slidably mounted upon the end plates, a fixed blade carried by the side bars, a cutter shaft journaled upon the side bars, rotary blades mounted upon the cutter shaft, pinions rigid with the cutter shaft, spring levers mounted upon the end plates and connected to the side bars for moving the same to bring the pinions of the cutter shaft into mesh with either the large or small gear elements of the drive wheels, and latch members arranged to have the spring levers sprung into engagement therewith to hold the mechanism in an adjusted position.

5. A multiple speed lawn mower, including a main frame formed with end plates, drive wheels mounted upon the end plates and each formed with a large interior rack and a small concentric gear member, idlers mounted upon the end plates and meshing with the small gear members, side bars slidably mounted upon the end plates, a fixed blade carried by the side bars, a cutter shaft journaled upon the side bars, rotary blades carried by the cutter shaft, pinions applied to the cutter shaft, operating levers mounted upon the end plates and connected to the side bars for sliding the same to bring the pinions of the cutter shaft into mesh with either the large interior racks of the drive wheels or the idlers, and means for locking the side bars in an adjusted position.

6. A multiple speed lawn mower including a main frame formed with end plates having slots therein, flanged drive wheels mounted upon the end plates and each formed with a large interior rack and a small central gear element, idlers journaled upon the end plates and meshing with the central gear elements, guideways upon the end plates of the main frame, side bars slidably mounted within the guideways, a fixed blade carried by the side bars, a cutter shaft journaled upon the side bars and extending through the before mentioned slots of the end plates of the main frame, rotary blades carried by the cutter shaft, pinions applied to the extremities of the cutter shaft, operating levers pivotally mounted upon the end plates of the main frame and connected to the side bars for sliding the same to cause the pinions of the cutter shaft to mesh with either the interior racks of the drive wheels or the idlers, and latch members coöperating with the operating levers to lock the side bars in an adjusted position.

In testimony whereof I affix my signature in the presence of two witnesses.

ELMER LOCKWOOD.

Witnesses:
RALPH LOCKWOOD,
A. ROY MIZE.

Copies of this patent may be obtained for five cents each, by addressing the "Commissioner of Patents, Washington, D. C."